Oct. 20, 1931.  C. OFFENHAUSER  1,827,902
MACHINE FOR COOKING SAUSAGES
Filed June 20, 1928  2 Sheets-Sheet 1

INVENTOR:
Christopher Offenhauser
BY
Herbert S. Fairbanks
ATTORNEY.

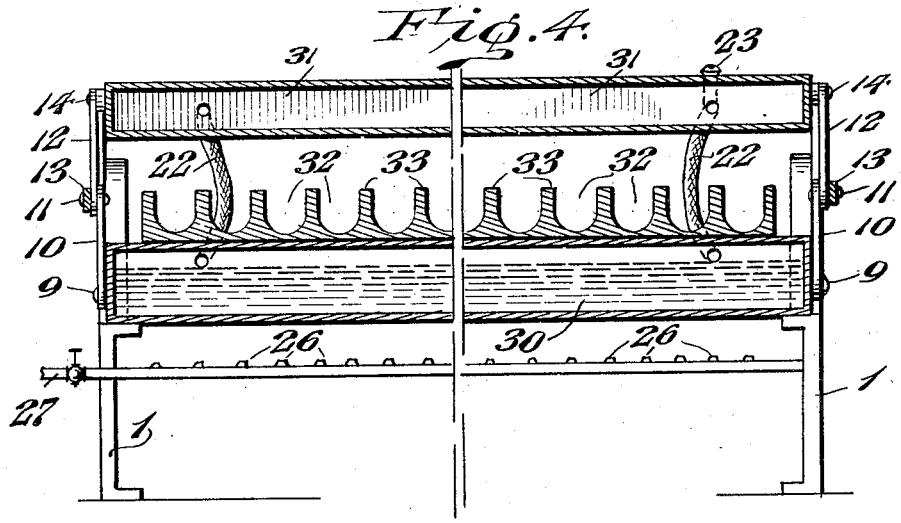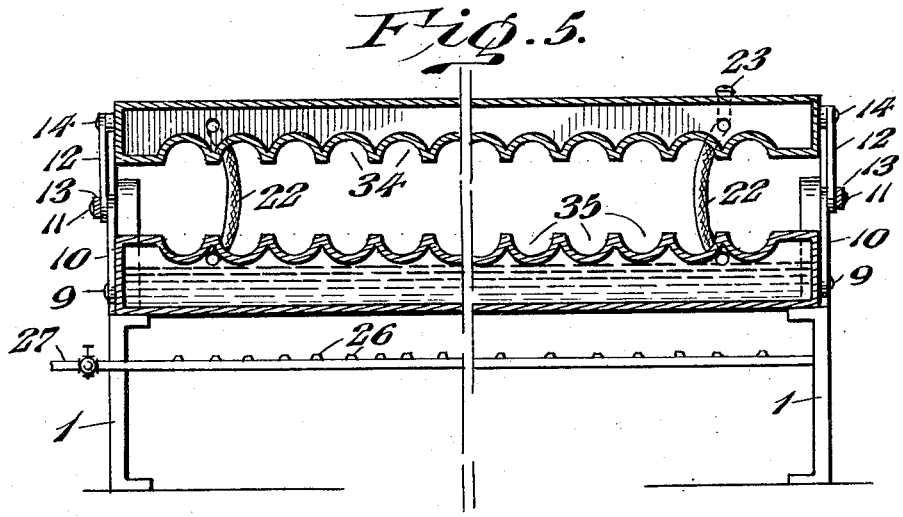

Patented Oct. 20, 1931

1,827,902

UNITED STATES PATENT OFFICE

CHRISTOPHER OFFENHAUSER, OF PHILADELPHIA, PENNSYLVANIA

MACHINE FOR COOKING SAUSAGES

Application filed June 20, 1928. Serial No. 286,953.

In the cooking of sausages, especially of the type known as Frankfurters, it is customary to cook them on a hot-plate, and when cooked in this manner even with frequent turning of the Frankfurters it is difficult to thoroughly cook them and the inner portions of the Frankfurters are in the majority of cases only partially cooked.

The object of this invention is to devise a novel machine for cooking sausages in which the cooking surface will completely surround the sausage so that it will be uniformly cooked to a desired degree.

A further object of this invention is to devise a novel machine for cooking sausages in which a plurality of cooking surfaces are employed which are relatively movable and which contribute to form cavities or grooves, the walls of which completely surround the sausages which are to be cooked.

A further object is to devise a novel construction and arrangement of an upper and a lower cooking member, and novel means for effecting their relative movement, and also novel means for maintaining their cooking surfaces at a desired temperature.

With the above and other objects in view as will hereinafter clearly appear, my invention comprehends a novel construction and arrangement of a machine for cooking sausages.

It further comprehends a novel construction of a sausage cooker wherein novel upper and lower cooking members are employed which are adapted to be internally heated to maintain their cooking surfaces at a desired temperature, and novel means are provided for effecting the relative movement of said cooking members.

It further comprehends a novel construction and arrangement of a cooking surface which will completely surround the articles being cooked.

Other novel features of construction and advantage will hereinafter more clearly appear in the detailed description and the appended claim.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 4 is a sectional elevation of another embodiment of my invention.

Figure 5 is a sectional elevation of another embodiment of my invention.

Similar numerals of reference indicate corresponding parts.

Referring to the drawings:—

1 designates the supporting frame of a machine for cooking sausages embodying my invention. The contour and arrangement of the supporting frame may vary widely in practice and the forms shown are only for the sake of illustration. The frame consists of end members which are connected and braced by the cross rods 2, in any desired or conventional manner.

Figure 1:
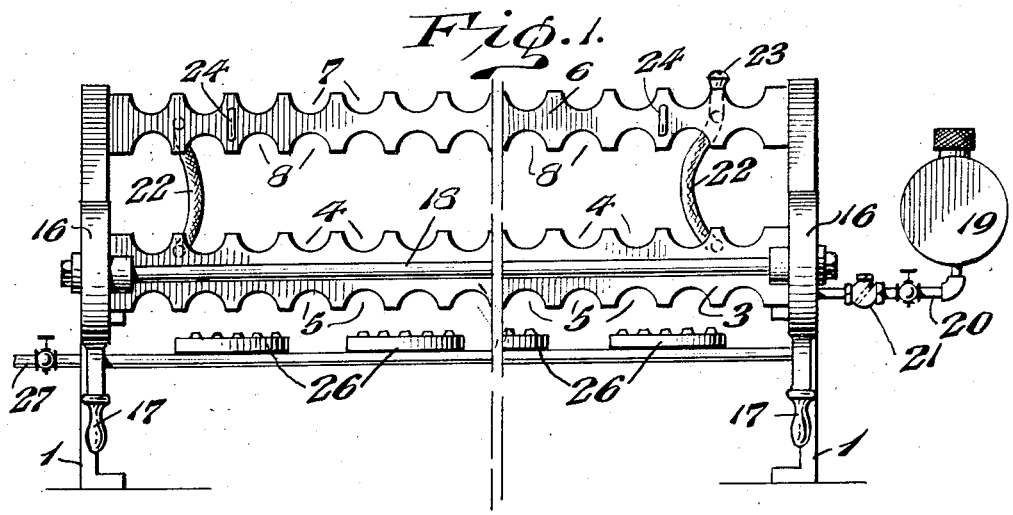
Figure 1 is a front elevation of a machine for cooking sausages embodying my invention.
Figure 2:
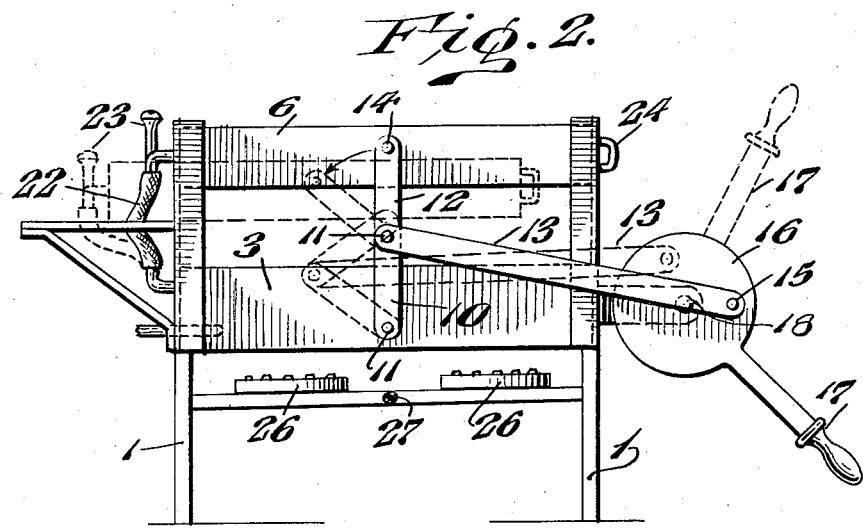
Figure 2 is an end elevation thereof.
Figure 3:
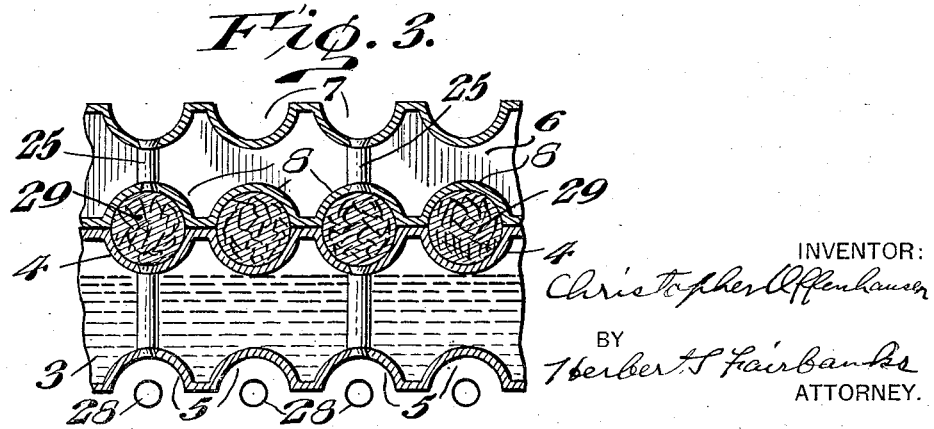
Figure 3 is a section through the heating members in their closed position and with articles being cooked in their cavities.

Referring first to the embodiment seen in Figures 1, 2 and 3, the frame 1 has mounted upon it in any desired manner, a lower cooking member 3 which is provided throughout its top and bottom faces with annular grooves or cavities 4 and 5 respectively, such grooves being substantially semi-circular in cross section. The upper cooking member 6 is, for convenience of manufacture, of the same construction as that of the lower cooking member 3, it being seen from Figure 1 that its upper face is provided with the grooves or cavities 7 while its lower face which forms the cooking face is provided with the grooves or cavities 8.

It will thus be seen that the upper and lower cooking members can be reversed in position or interchanged and a cooking surface will be provided when the two members are closed which will completely surround the articles which are being cooked, such as for example Frankfurters.

The cooking members may be opened and closed in any desired manner, and, for the purpose of illustration, I have shown one manner of accomplishing this action, so that the upper cooking member will be raised above the lower cooking member and be retained in its open position, as is desirable when the sausages are to be inserted into or removed from the machine. The lower cooking member 3 has pivotally connected at 11 to one end of a link 12, and also to one end of a link 13. The link 12 at its upper end is pivotally connected at 14 to the upper cooking member 6.

The link 13 at its outer end is eccentrically pivoted at 15 to the hub portion 16 of a manually actuated handle 17, which latter is rotatably supported at 18 on the machine frame. At each side of the machine, the cooking members are connected in a similar manner with a system of links, as already described.

19 designates a source of water supply, such as a tank from which the water flows by gravity through a valved control conduit 20 into the lower cooking member 3, and this conduit is provided with a check valve 21 which opens in the direction of flow from the tank 19.

The cooking members 3 and 6 are each internally chambered and their chambers are connected by the flexible hose 22.

A safety valve 23 is also preferably provided, and this may have a conventional type of whistle actuated by the steam escaping from the valve. The movable cooking member 6 is preferably provided with the handles 24. The internal chambers may, if desired, be reinforced by having their opposite walls connected with the reinforcing members or spacing rods, see Figure 3.

The lower cooking member 3 can be heated by any desired source of heat, and, in Figure 1, I have shown gas burners 26 disposed beneath the lower cooking member 3 and provided with a valved controlled fuel pipe 27. In Figure 3, instead of showing a gaseous fuel for heating the lower cooking member I have shown the electrical heating units 28, it being understood that any desired source of heat may be employed to heat the lower cooking member 3, and thereby the water contained therein, so that the steam generated will pass through flexible hose 22 into the internal chamber of the upper cooking member 6 to effect the heating of its cooking face.

In Figure 3, I have shown the manner in which sausages 29 are completely surrounded by a cooking surface, so that the entire surface of the sausage is properly cooked.

In the embodiment shown in Figure 4, the cooking face of the lower cooking member 30 and the upper cooking member 31 are plane surfaces, and these members are raised and lowered in the manner already described with reference to Figures 1 and 2. In this embodiment the articles to be cooked are mounted in the grooves or corrugations of the tray or drawer 33 which rests on the upper face of the lower cooking member 30 and the tops of the grooves are closed by the lower face of the upper cooking member 31, when the latter is lowered.

In the form shown in Figure 5 the juxtaposed faces of the cooking members are corrugated as shown at 34 and 35 respectively while the upper face of the upper cooking member and the lower face of the lower cooking member are not corrugated.

In the forms of my invention shown in Figures 1, 2, 3 and 5, I provide an upper and a lower cooking member having registering grooves or cavities to receive the articles to be cooked so that the sausages are completely surrounded by a cooking surface. In Figure 4 the sausages are also surrounded by a cooking surface.

Having thus described my invention what I claim as new and desire to secure by Letters Patent, is:—

In a cooking machine, relatively movable cooking members having intercommunicating internal chambers, a water supply communicating with one of said chambers, each of said members being of the same construction to render them interchangeable and reversible, each member having opposite faces provided with grooves so that juxtaposed faces when together form recesses, the walls of which surround the articles being cooked; and means to effect relative movement of said members.

CHRISTOPHER OFFENHAUSER.